Figure 1:
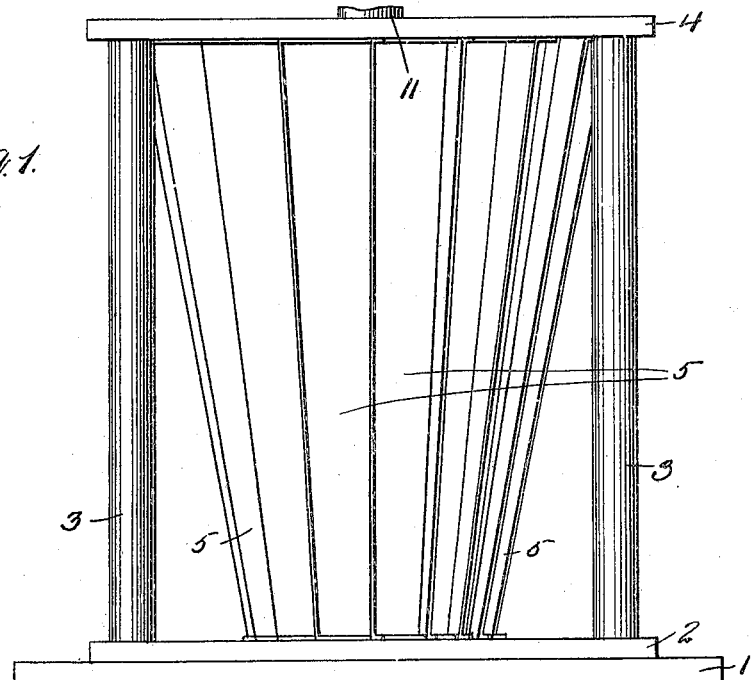

W. E. SNAMAN.
MOTOR.
APPLICATION FILED NOV. 9, 1908.

953,444.

Patented Mar. 29, 1910.
3 SHEETS—SHEET 1.

Witnesses
Samuel Payne
R. F. Butler

Inventor
W. E. Snaman.

By H. C. Evert & Co.,
Attorneys

W. E. SNAMAN.
MOTOR.
APPLICATION FILED NOV. 9, 1908.

953,444.

Patented Mar. 29, 1910.

3 SHEETS—SHEET 2.

Witnesses
Samuel Payne
R. H. Butler

Inventor
W. E. Snaman.

By H. C. Evert & Co.,
Attorneys.

W. E. SNAMAN.
MOTOR.
APPLICATION FILED NOV. 9, 1908.

953,444.

Patented Mar. 29, 1910.

3 SHEETS—SHEET 3.

Witnesses
Samuel Payne
R. H. Butler

Inventor
W. E. Snaman
By H. C. Evert & Co.
Attorneys

UNITED STATES PATENT OFFICE.

WILLIAM E. SNAMAN, OF PITTSBURG, PENNSYLVANIA.

MOTOR.

953,444.  Specification of Letters Patent.  Patented Mar. 29, 1910.

Application filed November 9, 1908. Serial No. 461,661.

*To all whom it may concern:*

Be it known that I, WILLIAM E. SNAMAN, a citizen of the United States of America, residing at Pittsburg, in the county of Allegheny and State of Pennsylvania, have invented certain new and useful Improvements in Motors, of which the following is a specification, reference being had therein to the accompanying drawing.

This invention relates to power motors, and more particularly to that type commonly known as wave motors, adapted to be located in the surf of the ocean and actuated by the undulatory and forceful movement of the water, and primarily aims to provide, in a manner as hereinafter set forth, a power motor of the class referred to with means whereby the water which has entered at the inlet side of the motor to operate it is utilized, with the least resistance and without agitation, to assist in the operation of the motor as such water passes from the motor at the outlet side thereof.

Furthermore, the invention aims to provide a wave motor of novel construction whereby a maximum degree of power can be obtained from a wave, irrespective of the depth of the same.

It is a well known fact that the surface or that portion of a wave in proximity to the surface has greater force and momentum than the lower portion thereof, and in view of such fact, the motor in accordance with this invention, is so set up as to present a larger area to the upper portion of a wave than to the lower portion, consequently, the operation of the motor will not be retarded by unequal pressures of the water.

A motor in accordance with this invention can be operated by any regular or irregular currents of motive fluid, such as water or air, but in the accompanying illustration a motor is shown as designed for strong currents of water, such as may be found in the ocean, lakes, rivers, or any other bodies of water, and briefly described, the motor in accordance with this invention embodies one or more series of circumferentially arranged and tangentially disposed stationary deflector blades, and a rotatable power transmitting wheel embodying a series of circumferentially arranged compound blades, said wheel being arranged in operative relation with respect to the one or more series of stationary deflector blades whereby the water will be deflected to and conducted from the wheel. The stationary deflector blades as well as the blades of the power transmitting wheel are so arranged as to provide a motor device of substantially inverted frusto-conical form whereby provision is made to obtain the full force of a wave.

With the foregoing and other objects in view, the invention consists of the novel construction, combination, and arrangement of parts hereinafter more specifically described and illustrated in the accompanying drawings, wherein is shown the preferred embodiment of the invention, but it is to be understood that changes, variations, and modifications can be resorted to which come within the scope of the claims hereunto appended.

Figure 2:
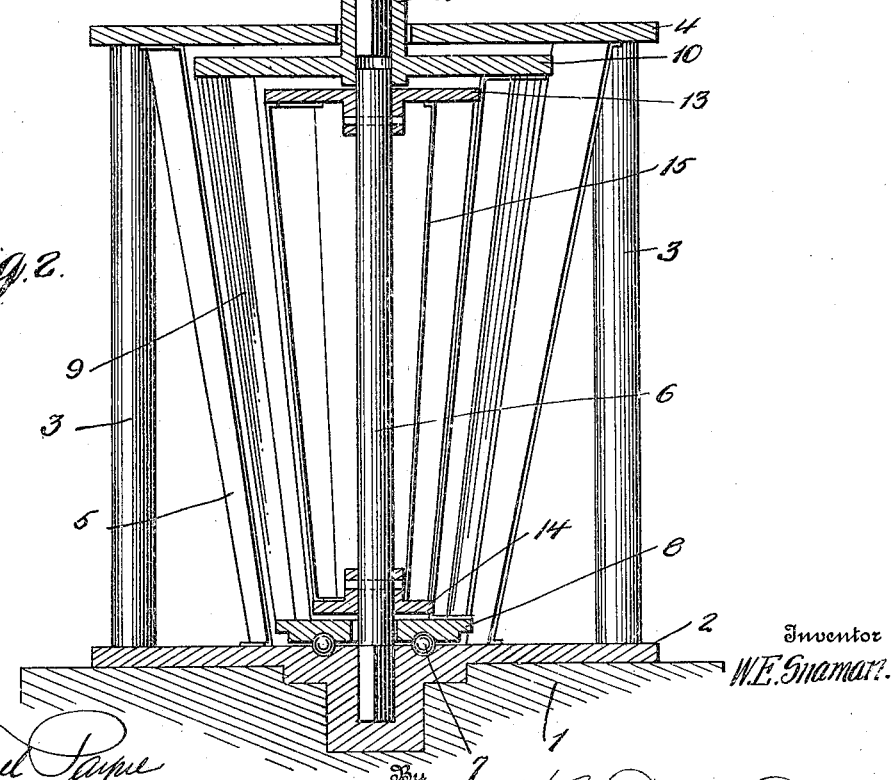
Figure 3:
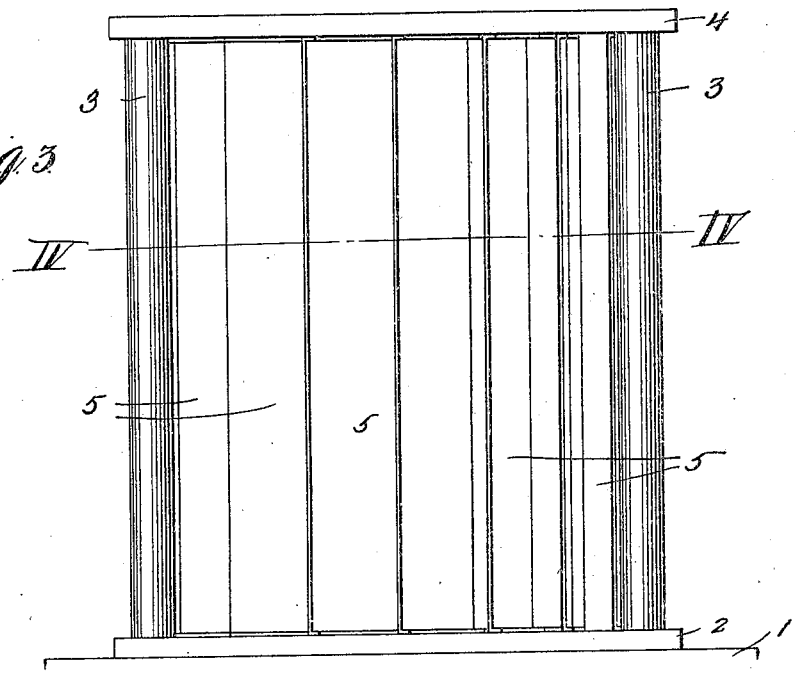
Figure 4:
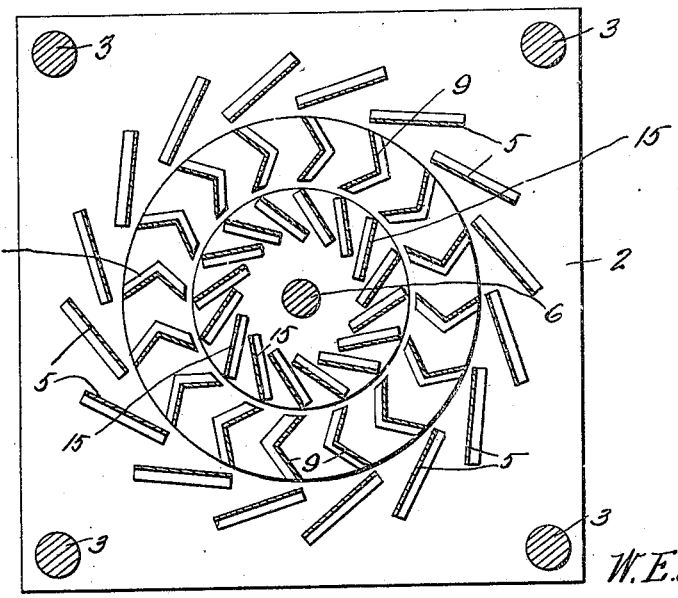
Figure 5:
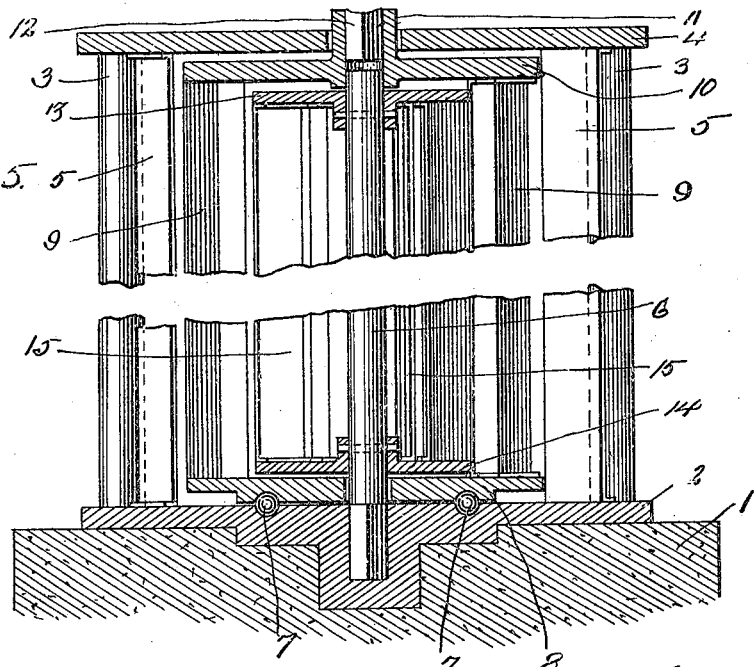
Figures 6, 7:
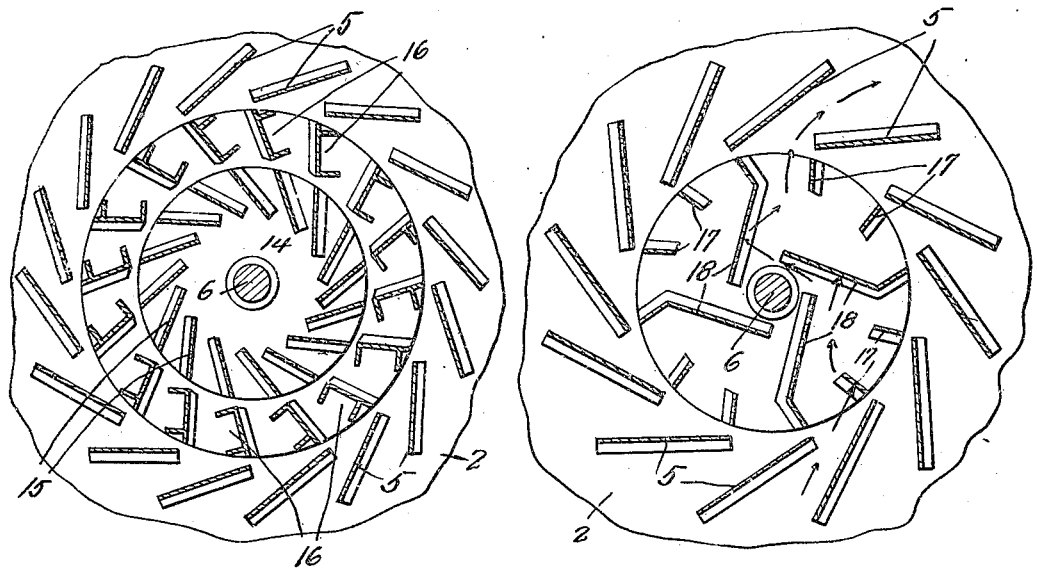

In the drawings, Figure 1 is an elevation of a power motor in accordance with this invention, Fig. 2 is a central vertical sectional view of the same, Fig. 3 is an elevation of a modified form of motor in accordance with this invention, Fig. 4 is a horizontal sectional view taken on line IV—IV of Fig. 3, Fig. 5 is a central vertical sectional view partly broken away illustrating another modification of the invention, Fig. 6 is a horizontal sectional view of the form of motor shown in Fig. 5, and, Fig. 7 is a horizontal sectional view of another modified form of power motor in accordance with this invention.

To provide for the effective working of motors of this type, it is the practice to set up a suitable foundation or bed 1, and, in accordance with this invention, there is mounted upon this foundation or bed 1, a motor frame consisting of a base plate 2 and a top plate 4 connected together by the posts 3. Within the motor frame is arranged a motor device comprising a power transmitting wheel and one or more series of deflector blades, which in the preferred form of construction, are so arranged as to provide a motor device substantially of inverted frusto-conical form whereby provision is made to obtain the full force of a wave, since the latter as is well known has a greater pressure at the surface than at the bottom.

Referring to Figs. 1 and 2, the motor comprises a power transmitting wheel and two series of circumferentially arranged deflector blades, the wheel being interposed between the two series of blades. The power transmitting wheel consists of an upper and a lower head 10 and 8 respectively, which revolve around a central vertical standard 6 which is fixed in a socket provided therefor in the base plate 2, the head 8 being in practice mounted on anti-friction balls 7 so as to reduce friction to a minimum. The upper head is of considerably greater diameter than the lower head 8 and the two heads 8 and 10 are connected together by means of circumferentially arranged and radially disposed compound blades 9, preferably V-shaped in cross section, so as to provide each of said compound blades 9 with an inner and an outer leg or side. The blades 9 taper from their upper to the lower ends thereof and are inclined in their circumferential arrangement upwardly and outwardly from their lower ends, so that the power transmitting wheel in its complete form has substantially the shape of an inverted truncated cone. Arranged circumferentially around the power transmitting wheel is a series of outer stationary deflector blades 5, fixed at their upper and lower ends to the top plate 4 and base plate 2 respectively, the said deflector blades 5 taper from their upper to the lower ends thereof and are inclined in their circumferential arrangement upwardly and outwardly from their lower ends. The blades 5 are further tangentially disposed with respect to an inscribed circle. Arranged within the power transmitting wheel are a series of inner stationary deflector blades 15 which are tangentially disposed with respect to an inscribed circle and taper from their upper to the lower ends thereof and are further inclined in their circumferential arrangement upwardly and outwardly from their lower ends. The blades 15 are fixed at their ends to heads 13 and 14 respectively. The head 13 is of greater diameter than the head 14 and the said heads 13 and 14 are secured to the central vertical standard 6. This manner of setting up the deflector blades 5 and 15 with respect to the power transmitting wheel and the blades of the latter being also set at an inclination, as stated it is evident that a motor device of substantially inverted frusto-conical form is provided so as to obtain the full force of a wave, as the area of the motor device is larger at its top than at its bottom. The outer legs of the blades 9 extend at right angles with respect to the blades 5 and the blades 15 are angularly disposed with respect to the inner legs of the blades 9. The standard 6 is of a length as to extend through and above the head 13 and projects into a sleeve 11 disposed centrally of the head 10. The sleeve 11 depends from and extends above the head 10 and has secured in the upper portion thereof a shaft 12 through the medium of which power is transmitted from the wheel to the mechanism which is to be operated.

The construction as disclosed by Figs. 3 and 4 of the drawings is the same as that shown in Figs. 1 and 2, with this exception, that the blades of the wheel and the deflector blades are vertically disposed, or in other words, extend in parallelism with respect to the standard 6. Otherwise than as stated the construction is similar.

As to the operation of the motor it will be stated, that the water passing between those deflector blades 5 positioned at what is termed the inlet side of the motor, such side of the motor being that which opposes the current or the wave, impacts against the outer legs of those blades 9 of the power transmitting wheel which are positioned at the inlet side of the motor. The impacting of the water upon the said outer legs causes the wheel to revolve and allows the water to escape from between the inner legs of the blades 9 and between the deflector blades 15 which are positioned at the inlet side of the motor. The water passes to the center of the motor device and escapes from there through the deflector blades 15 which are positioned at the outlet side of the motor device and impacts against the inner legs of the blades 9 which are positioned at the outlet side of the motor device. The impacting of the water against the said inner legs assists in revolving the power transmitting wheel. The water eventually escapes between the outer legs of the blades 9 at the outlet side of the motor device and is conducted away by the stationary blades 5 positioned at the outlet side of the motor device. It is therefore evident that after the water has been utilized to impact upon the power transmitting wheel upon the inlet side of the motor device and impart a rotary movement to the wheel, that the water is again utilized to assist the further movement of the wheel before the water escapes from the motor, consequently, the passage of the water through the motor device will revolve the power transmitting wheel and the pressure of the water will be fully utilized during the passage of the water through the motor device without retarding, agitating or interfering with the operation of the power transmitting wheel.

In the modified form shown in Fig. 6 of the drawings, the construction is the same as that shown in connection with Figs. 1 and 2, with this exception, that the blades of the power transmitting wheel, said blades being indicated by the reference character 16, are channel-shaped in lieu of V-shaped.

In the construction shown in Fig. 7, the inner series of stationary deflector blades are dispensed with and the power transmitting wheel used only in connection with the outer series of stationary deflector blades 5. To make provision for dispensing with the inner deflector blades 15, certain of the blades of the power transmitting wheel are extended, and in this connection it will be stated that the power transmitting wheel is provided with a series of radially disposed blades 17. Certain of the blades 17 which are oppositely disposed are provided with inwardly projecting inclined extensions 18, the extensions being inclined to a radius of the wheel in a direction opposite to the inclination of the blades 17 and the said extensions 18 of each pair of oppositely disposed blades extend in parallel planes. The extensions 18 are furthermore so disposed that successive extensions lie in planes that are at right angles to each other. The passage of the water through a wheel constructed in the manner as illustrated in Fig. 7 is indicated by the arrows and by reference to Fig. 7 it will be observed that the extension 18 of one of the blades 17 deflects the water against the extension 18 of the preceding blade, and from this latter extension escapes against the extension of a further preceding blade before the water escapes between the tangentially disposed stationary blades. It is therefore apparent that the driving power of the water entering the motor device is utilized three times on the wheel before the water escapes and that during the passage of the water through the motor, it will not retard the operation of the power transmitting wheel.

The blades of the motor device illustrated in Fig. 7 as well as those illustrated in Fig. 6, taper from their upper to the lower ends thereof and are inclined in their circumferential arrangement upwardly and outwardly from their lower ends so that each of the motor devices as illustrated in Figs. 6 and 7 will be of substantially inverted frustoconical form whereby provision is made to obtain the full force of the wave.

When the motor is used in currents where the pressure at the upper surface of the water is equal to the pressure at the lower portion thereof, the various blades of the motor can be arranged vertically and without tapering the same, as shown in Figs. 3, 4, and 5, and it is in this connection that the right is reserved to use such form of motor for mechanical or domestic uses.

Having now described my invention what I claim as new, is:—

1. A power motor comprising a pair of plates, a plurality of circumferentially arranged and tangentially disposed stationary blades fixed at their ends to said plates, said blades tapering from end to end and of a greater width at their upper ends than at their lower ends, a power transmitting wheel surrounded by said stationary blades and embodying a series of circumferentially arranged and radially disposed compound blades, said compound blades tapering from their upper to their lower ends, a pair of stationary heads arranged within said power transmitting wheel, and a series of circumferentially arranged and tangentially disposed stationary blades fixed at their ends to said head.

2. A wave motor, comprising stationary tangentially disposed deflector blades, a series of bodily revoluble radially disposed compound blades having outer and inner sides and with the outer side extending at right angles to said deflector blades, and a series of tangentially disposed stationary deflecting blades arranged within said compound blades extending at right angles to the inner sides of said compound blades, substantially as described.

3. A power motor comprising an inner rotatable wheel having a series of radially disposed blades, a series of tangentially disposed stationary deflecting blades surrounding said wheel, and a series of tangentially disposed deflecting blades arranged within said wheel, said last mentioned blades being disposed substantially at right angles to the inner portion of the radially disposed blades.

4. A motor of the type described comprising a power transmitting wheel having compound blades, a series of tangentially disposed stationary deflector blades surrounding said wheel, and a series of tangentially disposed blades arranged within said wheel.

5. A motor of the type described comprising a power transmitting wheel provided with radially disposed blades, a series of tangentially disposed stationary blades surrounding said wheel and extending at right angles with respect to the surfaces of the blades of the wheel, and a series of tangentially disposed stationary deflector blades arranged within said wheel and extending at right angles with respect to the surfaces of the blades of the wheel.

6. A motor of the type described, comprising a conical revoluble wheel, a plurality of tapering compound blades carried thereby, a series of tangentially disposed stationary tapering blades, and a series of tangentially disposed tapering stationary blades arranged within said wheel.

7. A motor of the type described, comprising a conical structure having inner and outer circumferentially arranged stationary blades, and compound blades revolubly mounted between said inner and outer blades with the surfaces thereof disposed at right angles to said inner and outer blades.

8. A motor of the type described, comprising inner and outer stationary circumferentially disposed blades, a wheel revolubly mounted between said inner and outer stationary blades and embodying a series of blades with the outer portions thereof extending at right angles to the outer stationary blades and the inner portions thereof extending at right angles to the inner stationary blades.

9. A motor of the type described comprising a conical revoluble wheel having a series of compound blades, said blades being of greater area at one end than at the other end, and a series of tangentially disposed stationary deflector blades having their surfaces extending at right angles with respect to the compound blades of said wheel.

10. A motor of the type described, comprising a revoluble wheel, propeller blades carried thereby, and a series of stationary deflecting blades arranged within said wheel for deflecting motive power from one inner side of the wheel to the opposite inner side.

11. A motor of the type described, comprising an inner rotatable wheel having a series of propelling blades, a series of stationary deflecting blades arranged tangent to said wheel, and stationary blades arranged within said wheel for directing motive power from one inner side of said wheel to the opposite inner side thereof.

12. A motor of the type described comprising an inner and outer set of stationary circumferentially arranged deflecting blades, and a wheel arranged between said sets of blades and having blades adapted to be propelled by water passing between the blades of each set.

13. A motor of the type described comprising a conical structure having a series of circumferentially arranged stationary outer deflector blades, said blades upwardly and outwardly inclined, in combination with a conical power transmitting wheel having a plurality of blades, the blades of said power transmitting wheel being upwardly and outwardly inclined and said power transmitting wheel surrounded by said outer series of stationary blades.

14. A motor of the type described, comprising a structure having stationary tangentially disposed blades, in combination with an inverted frusto-conical shaped power transmitting wheel rotatably mounted in said structure and adapted to be propelled by motive power deflected by said stationary blades.

15. A motor of the type described comprising a series of circumferentially arranged and upwardly and outwardly inclined stationary deflector blades, in combination with an inverted frusto-conical shaped power transmitting wheel arranged in operative relation with respect to said blades and adapted to be propelled by a motive power deflected by the blades.

16. A power motor comprising a series of circumferentially arranged and tangentially disposed deflector blades, in combination with a conical shaped power transmitting wheel surrounded by said deflector blades and adapted to be actuated by a motive power deflected by said blades.

17. A power motor comprising a conical wheel, and a series of tangentially disposed deflector blades surrounding said wheel, said blades of greater width at one end than at the other end.

18. A power motor comprising a conical wheel, and a series of tangentially disposed deflector blades surrounding said wheel, said blades of greater width at one end than at the other end, said blades being upwardly and outwardly inclined.

19. A power motor comprising a conical power transmitting wheel having a radially disposed series of blades, and stationary deflector blades surrounding said wheel, the blades of the wheel being disposed at right angles with respect to the surfaces of the deflector blades.

20. A power motor comprising two series of tangentially disposed deflector blades, and a power transmitting wheel interposed between said two series of blades and embodying radially disposed propeller blades.

21. A power motor comprising two series of tangentially disposed deflector blades, and a power transmitting wheel interposed between said two series of blades and embodying radially disposed compound propeller blades.

22. A motor comprising a power transmitting wheel provided with a series of circumferentially-arranged propeller blades radially-disposed with respect to the axis of the wheel and each being upwardly and outwardly-inclined throughout, and a circumferentially-extending series of stationary deflector blades surrounding said propeller blades, said deflector blades being tangentially-disposed with respect to the wheel and each of said deflector blades being upwardly and outwardly-inclined throughout.

23. A motor comprising a power transmitting wheel provided with a series of circumferentially-arranged propeller blades radially-disposed with respect to the axis of the wheel and each being upwardly and outwardly-inclined throughout, and a circumferentially-extending series of stationary deflector blades surrounding said propeller blades, said deflector blades being tangentially-disposed with respect to the wheel and each of said deflector blades being upwardly and outwardly-inclined throughout, each of said propeller blades and each of said deflector blades gradually increasing in width from its lower to its upper end.

24. A motor comprising a power transmitting wheel, and a series of deflector blades surrounding said wheel, said deflector blades being stationary and each being upwardly and outwardly-inclined throughout, said blades tangentially-disposed with respect to said wheel, each of said deflector blades gradually increasing in width from its lower to its upper end and said wheel gradually decreasing in diameter from its lower to its upper end.

25. A motor comprising a power transmitting wheel having inclined and tapering propeller blades, and inclined tapering stationary deflector blades arranged in operative relation with respect to said propeller blades, said deflector blades independent of said wheel.

26. A motor comprising a power transmitting wheel gradually increasing in diameter from one end to the other, and stationary deflecting means surrounding said wheel, and a stationary deflecting means surrounded by said wheel.

27. A motor comprising a power transmitting wheel gradually increasing in diameter from one end to the other and embodying compound radially-disposed propeller blades, a stationary deflecting means surrounding and independent of said wheel, and a stationary deflector means surrounded by the wheel and independent thereof.

28. A motor comprising a power transmitting wheel gradually increasing in diameter from one end to the other and embodying compound radially-disposed propeller blades, a stationary deflector means surrounding and independent of said wheel, and a stationary deflector means surrounded by the wheel and independent thereof, said propeller blades being upwardly and outwardly-inclined and each of said deflecting means being upwardly and outwardly-inclined.

In testimony whereof I affix my signature in the presence of two witnesses.

WILLIAM E. SNAMAN.

Witnesses:
 MAX H. SROLOVITZ,
 K. H. BUTLER.